(12) United States Patent
Kooken et al.

(10) Patent No.: US 9,839,967 B2
(45) Date of Patent: Dec. 12, 2017

(54) SYSTEM AND METHOD FOR REAL-TIME COMPUTATION AND REPORTING OF WELDING MACHINE PERFORMANCE AND METRICS

(75) Inventors: Todd Kooken, Solon, OH (US); Matthew Jon Krueger, Medina, OH (US); Lifeng Luo, Solon, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 1299 days.

(21) Appl. No.: 13/291,328

(22) Filed: Nov. 8, 2011

(65) Prior Publication Data

US 2013/0116849 A1    May 9, 2013

(51) Int. Cl.
*B23K 9/10* (2006.01)
*B23K 9/095* (2006.01)

(52) U.S. Cl.
CPC .......... *B23K 9/0953* (2013.01); *B23K 9/1043* (2013.01)

(58) Field of Classification Search
USPC ......... 219/130.01, 130.1, 130.21, 130.5, 485
See application file for complete search history.

(56) References Cited

U.S. PATENT DOCUMENTS

| | | | | |
|---|---|---|---|---|
| 4,493,040 A * | 1/1985 | Vanderhelst | ......... | B23K 11/252 219/109 |
| 4,864,479 A * | 9/1989 | Steigerwald et al. | ........... | 363/17 |
| 4,985,612 A * | 1/1991 | Izume et al. | .................. | 219/116 |
| 5,406,051 A * | 4/1995 | Lai | ............................. | 219/130.1 |
| 5,523,541 A * | 6/1996 | Ishikawa | ............... | B23K 11/257 219/110 |
| 6,239,407 B1 * | 5/2001 | Thommes | ................ | B23H 7/08 219/130.21 |
| 6,806,446 B1 * | 10/2004 | Neale | ........................... | 219/497 |
| 7,049,546 B2 * | 5/2006 | Thommes | ................ | 219/130.21 |
| 7,067,766 B2 | 6/2006 | Saccon et al. | | |
| 7,831,343 B2 * | 11/2010 | Formanski et al. | ............ | 701/22 |
| 2004/0089645 A1 | 5/2004 | Saccon et al. | | |
| 2005/0035105 A1 * | 2/2005 | Spear et al. | ................ | 219/130.5 |
| 2005/0061791 A1 * | 3/2005 | Matus | .................. | B23K 9/1006 219/130.21 |
| 2006/0213890 A1 * | 9/2006 | Kooken et al. | .......... | 219/130.21 |
| 2007/0210071 A1 * | 9/2007 | Ganev et al. | ................. | 219/505 |
| 2007/0267393 A1 * | 11/2007 | Dodge | .................. | B23K 9/092 219/130.1 |

(Continued)

FOREIGN PATENT DOCUMENTS

CN    1864324 A    11/2006
CN    201287233 Y    8/2009

(Continued)

OTHER PUBLICATIONS

International Search Report dated Apr. 16, 2013.
Chinese Patent Application No. 201280066456.7, Office Action, 5 pages, dated Mar. 19, 2015.

*Primary Examiner* — David Angwin
*Assistant Examiner* — Gyounghyun Bae
(74) *Attorney, Agent, or Firm* — Perkins Coie LLP

(57) ABSTRACT

A welding or cutting system is provided using a performance module which monitors the real-time performance of a welding or cutting system and displays this information on a user interface on the system. Other embodiments of the system also include a cost calculation function in which a cost of the welding or cutting operation is calculated.

22 Claims, 5 Drawing Sheets

(56) References Cited

U.S. PATENT DOCUMENTS

| | | | |
|---|---|---|---|
| 2008/0083705 A1* | 4/2008 | Peters | 219/61 |
| 2008/0088183 A1* | 4/2008 | Eckroad et al. | 307/66 |
| 2009/0159572 A1* | 6/2009 | Salsich et al. | 219/121.36 |
| 2009/0160573 A1* | 6/2009 | Salsich et al. | 333/25 |
| 2009/0172453 A1* | 7/2009 | Dishman | G06F 1/263 |
| | | | 713/340 |
| 2009/0277893 A1 | 11/2009 | Speilman | |
| 2010/0006551 A1* | 1/2010 | Geissler | B23K 9/1018 |
| | | | 219/130.1 |
| 2010/0185336 A1* | 7/2010 | Rovnyak et al. | 700/287 |
| 2010/0208501 A1* | 8/2010 | Matan et al. | 363/95 |
| 2010/0280676 A1* | 11/2010 | Pabon et al. | 700/295 |
| 2010/0314372 A1* | 12/2010 | DuVal et al. | 219/133 |
| 2011/0006046 A1* | 1/2011 | Albrecht | 219/133 |
| 2012/0095941 A1* | 4/2012 | Dolson | B23K 9/0953 |
| | | | 705/400 |
| 2013/0175248 A1* | 7/2013 | De Rosa | B23K 9/0956 |
| | | | 219/130.01 |

FOREIGN PATENT DOCUMENTS

| | | |
|---|---|---|
| CN | 202385326 U | 8/2012 |
| WO | 9701211 A1 | 4/2012 |

* cited by examiner

SYSTEM AND METHOD FOR REAL-TIME COMPUTATION AND REPORTING OF WELDING MACHINE PERFORMANCE AND METRICS

BACKGROUND OF THE INVENTION

Field of the Invention

Devices, systems, and methods consistent with the invention relate to welding and cutting, and more specifically related to systems and methods for real-time computation and reporting of welding machine performance and metrics.

Description of the Related Art

As welding technology and applications have advanced so have the demands on welding and cutting power supplies. These increased demands require power supplies to provide increased efficiency, power density and output power capabilities. Further, the cost of electricity has increased, causing the cost of using high power systems to rise. Therefore, there is a demand and desire to use these higher power welding and cutting systems more efficiently, such that their cost of operation is optimized.

BRIEF SUMMARY OF THE INVENTION

An exemplary embodiment of the present invention is a welding or cutting power supply with a housing and a power conversion module located within the housing which receives an input signal having a first voltage, first current and first power and converts the input signal into an output signal having a second voltage, second current and second power which are each different from the respective first voltage, current and powers. The power conversion module provides the output signal to a load. Also included is a performance monitoring module located within the housing and electrically coupled to the power conversion module which receives a reference signal from the input signal and a reference signal from the output signal during operation of the power conversion module and determines a real-time efficiency of the power conversion module by comparing the first power to the second power during an operation of said power conversion module. At least one of a user interface and a data connection device is coupled to the housing to provide the determined real-time efficiency to a user. Real-time power factor correction and cost monitoring can also be provided.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
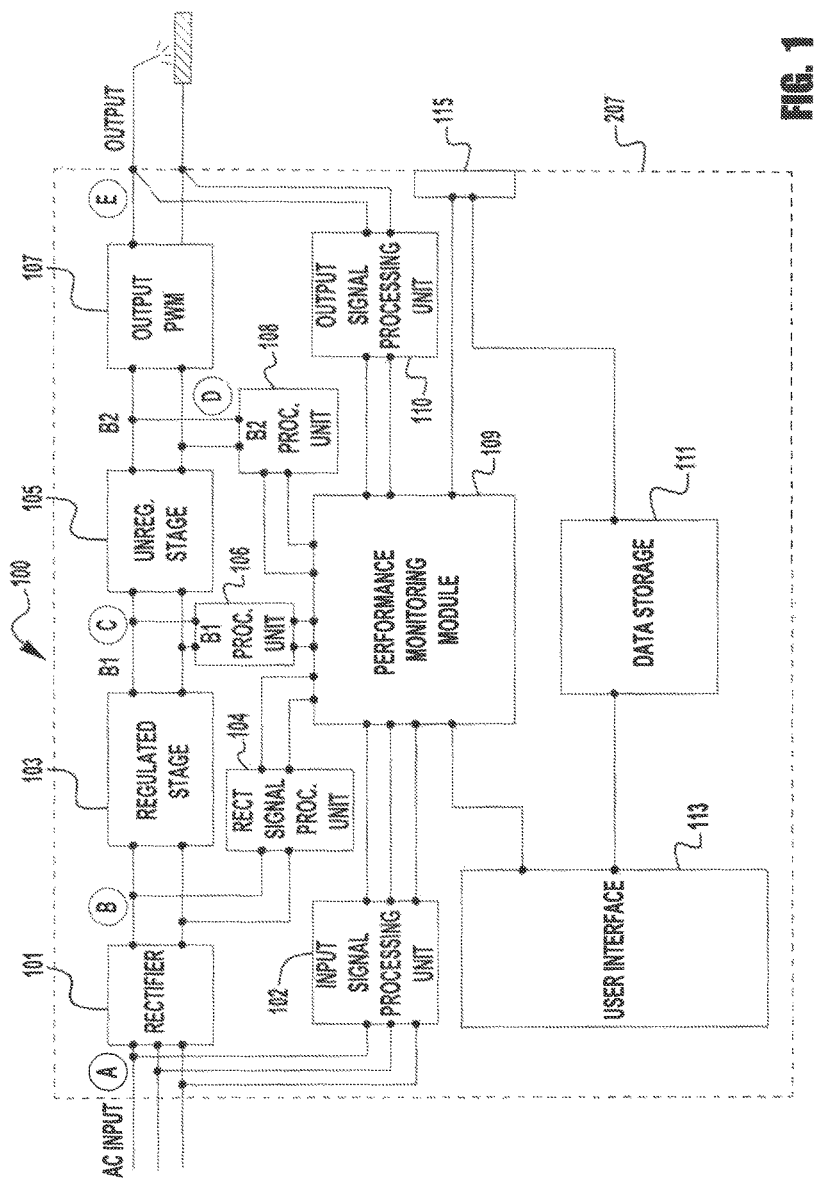
FIG. 1 illustrates a diagrammatical representation of a welding system in accordance with an exemplary embodiment of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 depicts an exemplary power supply 100 of the present invention which is capable of welding or cutting. The power supply 100 can have any general topology or structure and the topology shown in FIG. 1 is intended to be exemplary and not limiting as other topologies will also be within spirit or scope of the present invention. In the embodiment show, the system 100 has an inverter-type topology in which an AC input signal is provided to an input rectifier 101 which rectifies the AC signal. The rectified signal is then directed to a regulated stage 103 which can be any one of a boost circuit, buck circuit or combined buck-boost circuit which creates a DC bus B1 having a relatively fixed voltage level. In an exemplary embodiment of the present invention, the regulated stage 103 performs power factor correction on its input signal to improve the performance of the system 100. The implementation and structure of power factor correction circuits is generally known and will not be discussed in detail herein, as skilled artisans are familiar with its use and implementation. Downstream of the DC bus B1 is an unregulated stage 105 which can comprise an inverter, transformer and/or rectifier to convert the DC bus B1 signal to a second DC bus B2 having a different DC bus voltage than the first DC bus B1. The second DC bus B2 is directed to an output circuit 107 which provides an output signal for welding or cutting, as needed. The output circuit 107 can be any type of circuit capable of producing a welding or cutting output, such as a chopper, PWM, etc. The system 100 also comprises a performance monitoring module 109, a data storage device 111, a user interface 113 and a data connector 115.

Because the operation of such welding or cutting topologies is generally know a detailed discussion of the operation of the welding and cutting system 100 will not be described herein.

In various embodiments, the performance module 109 receives performance feedback/feed forward information from the input signal, components of the system 100, at the input/output of some of the system 100 components and/or at the output of the system 100. Exemplary connections are shown in FIG. 1. This feedback information is used by the performance module 109 to evaluate performance parameters of the system 100 and calculate the operational efficiencies of the system 100. This will be discussed further below. As shown in FIG. 1, an input signal processing circuit 102 receives the input signal at point A and determines the voltage, current, frequency and/or power of the input signal. The circuit 102 then processes the determined values into either an analog or digital signal to be received by the module 109. Such circuit types are generally known and the structure need not be described herein in detail. However, the circuit 102 should be of a type that is capable of receiving and processing a range of input voltages, currents, frequencies and powers. This is because the welding or cutting system 100 is capable of receiving and functioning over a variety of input signals. For example, the system 100 can operate with an input signal with is either single or three-phase (three-phase is shown), over a range of input voltages (e.g., 100 to 600 volts), over a range of an input frequencies (e.g., 50 to 60 Hz), over a range of currents and input power. Similarly, a rectified signal processing unit 104 receives the signal from point B and processes it to provide the desired feedback/feed forward information to the module 109. This information can be any of voltage, current, power and/or frequency. Output signal processing circuit 110 performs a similar function with the output signal at point E, which can be feedback of any of power, voltage, and/or current.

In other exemplary embodiments, similar signal processing circuits 106 and 108 process signals from the respective DC buses B1 and B2, respectively (points C and D). Again, these processing circuits can process any of the voltage, current, frequency and power of the signals at their respective locations and provide that information to the performance monitoring module 109.

The user interface 113 is the user interface of the system 100 which allows a user to input operational information to the system 100 and also contains a display screen which displays operational information of the welding or cutting operation. The data storage device 111 is any kind of data storage mechanism which is capable of receiving and storing performance and operational information of the system 100. A data connection 115 is also provided and is coupled to at least the module 109 and/or the data storage device 111 to allow for the transfer of information to and from the module 109 and/or storage device 111. The data connection device 115 can be of any known type including but not limited to a wired or wireless data connection device 115. Examples of a wireless data connection device 115 are those capable of communicating with other devices using cellular, Bluetooth, or any other type of wireless connection, such as IEEE 802.11 compliant wireless communications, while examples of a wired-type data connection device 115 includes connections such as Ethernet, universal serial bus (USB), mini-USB, or the like. Further, the data communication device 115 can operate in/communicate via any type of network, including for example via a cellular, public wireless, and/or private wireless communication network. Further, the data connection device 115 can communicate via an internet based communication network.

As shown in FIG. 1, the performance monitoring module 109 receives a signal from the input AC signal at point A and/or the rectified AC signal, point B, which informs the performance module 109 of the input signal voltage, current, frequency, reactive or apparent power (KVA) and/or real power (watts). Further, the performance monitoring module 109 receives a signal E from the output of the system 100 of the output signal current, voltage, frequency and/or power (watts). The performance module 109 uses the signals A and/or B and E to determine performance characteristics of the system 100.

In an exemplary embodiment, the module 109 determines the overall efficiency of the system 100 by comparing the input power (e.g., watts) with the output power (e.g., watts). For example, efficiency=(output power/input power)×100. This efficiency provides an overall efficiency of the welding or cutting system 100 during operation. In addition to determining efficiency, the performance module 109 can use this information to determine the total amount of power or energy used by the system 100 during various stages of operation. For example, the performance module 109 can determine energy/power usage during idle periods and during operation, and can in fact determine energy usage for each welding operation being performed. Of course, the module 109 can determine efficiency during these similar operational or idle periods. These efficiency and energy consumption determinations can be made real-time based on the real-time feedback of the signals at A and E, B and E, or A and B and E. A sampling rate for each of the signals should be selected to ensure that to provide sufficient real-time information. It should be noted that if the efficiency is determined using the signal from downstream of the rectifier 101 (or any initial stage) then any power losses in the rectifier 101 should be considered in the calculation of efficiency. Because there are some power losses in the initial stage 101 an accurate efficiency calculation would take into account those losses. Such losses can be considered using an efficiency curve for the stage 101 (which can be in the form of a look-up table) so that the appropriate losses are considered at the proper load levels.

In addition to determining efficiency of the system 100, the module 109 can also determined the real-time power factor of the system 100. It is generally known that the power factor of a system is the ratio of real power (watts) to the apparent power (volts*amps) of the system 100. Thus, the module 109 can use the appropriate signal information from either A and B to determine the power factor of the system 100 during various modes of operation, or during different welding jobs. Thus the power factor ratio is (real power (watts)/apparent power (V×I))×100.

It should be noted that embodiments of the present application can be utilized in power supplies which receive either a single or three phase input signal. Embodiments of the present invention are not limited in this regard.

During operation the calculated system efficiency and/or power factor ratio are communicated to the user interface 113 so that this information is actively displayed on the user interface 113. Because of this, a user of the system 100 can monitor, in real time, the efficiency and/or the power factor of the system 100 during operation. This will be discussed further below. In other exemplary embodiments, the module 109 can send this information to the data storage device 111 to store this information to be recalled at a later time. In addition, in further embodiments the module 109 can send this information to the data connection device 115 so that the information can be communicated to another device or network so that the information can be reviewed remotely from the welding system 100.

Thus, during operation the user of the system 100 can monitor, in real-time, the system efficiency and/or power factor of the system. This allows the user to determine if the system 100 is being utilized in an optimal manner or if there are any issues or anomalies during operation. Further, because of the data storage device 111, the user can call up stored information regarding an operation that has already occurred. For example, the storage device 111 can record all of the data from an operation as well as recording maximum and minimum levels of the operational criteria during a welding or cutting operation. This allows the user to, after an operation is complete, review the history of a welding or cutting operation to view the maximum and minimum efficiency and/or power factor of a given welding or cutting operation. Further, the data storage device can also record and store other criteria regarding an operation, including but not limited to the median and mean of the efficiency and power factor. In fact, any number of statistical math operations can be performed utilizing the collected data, including maximum, minimum, average, etc.

In another exemplary embodiment, at least one of the performance module 109 and/or the storage device 111 stores information regarding the cost of energy (for example KW/hr cost) used by the system 100. That is, if the system 100 draws its power from a utility grid a user can input the cost of the utility power into the module 109 and/or the storage device 111 via the user interface 113 or the data connection 115 (for example via a computer). Alternatively, if the system 100 is drawing power from an off-grid source (generator, etc.) the user can input the cost of that power. Additionally, in another exemplary embodiment the module 109 contains a clock timer which tracks the date and time of operation. In such embodiments, the module 109 and/or the storage device 111 is capable of storing multiple power cost factors which are assigned to different times and dates of operation. For example, it is known that utility power can have a different cost (KW/hr) depending on the time of day that the power is consumed. Thus, if a utility has two or more different power costs for a given time period, these different cost factors can be stored and utilized by the module 109.

With this information the module 109 can calculate, display (on the user interface) and/or transmit to another device (via the data connection 115) the cost of a welding or cutting process or operation. The system 100 can also display the cost of energy used in a set time period (for example during a day). For example, the user interface 113 can display the total cost of energy used during a day or during a welding operation, while at the same time showing the real-time efficiency and power factor of the system 100.

In a further exemplary embodiment of the present invention, any one of the controller 109 and/or data storage device 111 contains information regarding utility power charges that are related to peak vs. off-peak power usage, seasonal power usage variations, energy charges, and/or demand charges, and the controller 109 can monitor power usage by the system 100 relative to any one, or all, of these energy cost drivers. For example, it is known that utility power companies not only charge a fee for the usage of energy (Kw/hr charge) but they can also charge based on demand. This is called a demand charge which can penalize the erratic use of power over a given time period (1 month). Typically, to monitor "demand" a utility will take a snapshot of power usage at a facility at consistent intervals (e.g., every 15 minutes) and the highest power usage of the snap-shots will drive the demand charge cost. Thus, if two different facilities are using the exact same amount of power in a month (e.g., 10,000 kw/hr), the facility which uses this power steadily over the entire time period (10,000/30 days=333.33 Kw/hr per day) will be charged less than the facility that uses the power erratically because the second facility will have a higher demand charge for the time period (e.g., a spike of 1,000 kw/hr in a given day). By storing this data and monitoring real time power usage and consumption, embodiments of the present invention allow the user to monitor power usage against any of these utility metrics or costs to ensure that they are optimizing power usage and are not exceeding any defined power usage requirements. For example, the user can enter power usage limits or metrics into the system 100 as either limits or monitoring points and the system 100 can compare actual usage to the limits to give the user an accurate assessment of power usage.

It is quite common for a user to perform different welding or cutting functions in a given period of time. For example, if the system 100 is used for welding it is possible for the system 100 to perform two or more different welding operations during a day or during other periods of time. The welding operations can vary by duration, load, energy consumed, etc. Embodiments of the present invention allow the user to view the efficiency, power factor and total cost of each of the different welding operations in real-time. This information can be employed by a user in any number of ways. For example, the user can determine that a first welding operation would cost significantly less if performed at a different time of the day. Further, the user can determine that a particularly welding operation results in diminished efficiency of the system 100, thus allowing the user to change some variables of the operation to improve operational efficiency. Further, the data can be stored for any desired duration of time to allow historical data to be retrieved as necessary.

The module 109 can be constructed in any number of ways and can be implemented in a number of ways without departing from the scope and spirit of the present invention. In an exemplary embodiment of the present invention the performance module is a digital controller, and can be, for example, a C2000 series digital signal controller as sold by Texas Instruments. Of course, this example is not intended to be limiting as other types of controllers can be used, so long as they are capable of performing functions similar to those discussed herein.

As shown in FIG. 1, other exemplary embodiments of the present invention can receive signals from the respective DC buses B1 and B2. These signals can be used to monitor the voltage or current levels of these buses and display that information on the user interface 113. For example, the system 100 may be configured to maintain the first DC bus at a fixed level (for example 400 volts), and circuit 108 can monitor this voltage and display the detected voltage on the interface 113 similar to that described above. As such, the user can determine if the bus B1 and/or B2 is being maintained at a desired level (perhaps within a given tolerance level) or if there are significant anomalies or transients in the bus voltage. Further, these additional signals can be used to monitor the performance of the circuits in the system 100. For example, the module 109 can monitor the performance of the regulated stage 103 during operation and determine if the stage 103 is operating within an acceptable operational range. If the module determines that the stage 103 is operating outside of a predetermined operational range then an error message can be displayed on the user interface 113. Alternatively a "service requested" indication can be displayed on the user interface 113. This can be similarly performed on any of the stages of the power supply, including the unregulated stage 105 and/or the output stage 107. In such embodiments the module 109 will have predetermined performance metrics stored therein to compare to the performance of the overall system and/or some or all of its components. When the performance level of the system 100 and/or its components drops below this predetermined level then an indication is provided in the user interface 113 to alert the user that a performance issue has been identified. Thus, embodiments of the present invention can be have either predetermined performance metrics, or performance metrics entered or programmed by the user, to which actual performance is compared during operation and if system performance is detected below the performance metric the system 100 can display a warning indicator. In an exemplary embodiment, the system 100 monitors either at least one of the power factor and efficiency of the system 100 and compares the real-time data to the predetermined thresholds and provides a status indication to the user if the performance drops below the performance metric levels. In some embodiments, the system 100 can display a first warning when performance drops below the threshold level to indicate that performance is not optimal, and then a second warning when performance falls below a second threshold level which can indicate a serious maintenance issue. For example, the second warning level can be set at when performance falls below 90% of the first threshold performance value. In exemplary embodiments of the present invention, the controller 109 contains a timer circuit which monitors a time duration of any performance levels which fall below a performance metric threshold so that reporting of false errors can be mitigated. In some welding operations there may be anomalies which cause the performance of the system 100 to drop intermittently below the performance metrics which are reflective of something other than a compromised system 100. Thus the timer monitors the duration of any drops below the performance metric levels and if the drop in performance is below a threshold duration no error is reported, and when the drop in performance extends beyond the duration threshold an error is reported.

Figure 2:
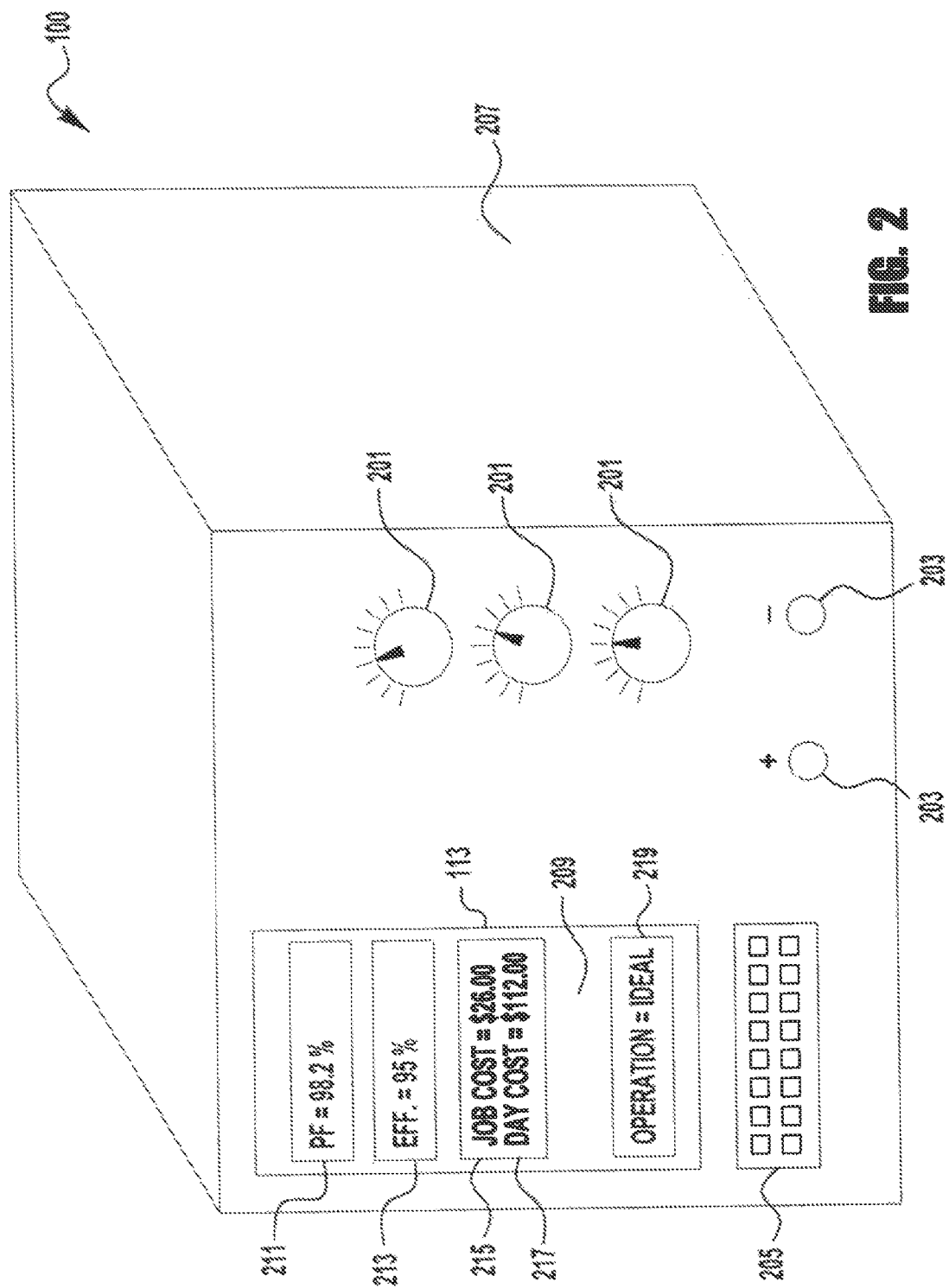
FIG. 2 illustrates another diagrammatical representation of an exemplary embodiment of the present invention.

FIG. 2 depicts an exterior of an exemplary system 100 in accordance with an embodiment of the present invention, where the system 100 is encased in a housing 207. The system 100 contains a plurality of input controls 201 which allow a user to input welding or cutting parameters, such as voltage, current, wire feed speed, etc. These controls 201 are used by the user to define the parameters of a welding or cutting operation. Their utilization is known and will not be described in detail herein. The system 100 also has at least two output studs 203 which provide the welding or cutting current/signal to for the operation. These studs would be coupled to leads as is generally known. As described above, the system 100 also has a user interface 113, as well as a data entry panel 205. The user interface 113 can have any kind of display screen 209 including, but not limited to, LCD, LED, etc., which displays information to the user. Similarly, the data entry panel 205 can be any type of panel which permits the user to input and/or access information stored within the data performance module 109, including but not limited to a keypad, a touch screen, track-ball, etc.

As described above, the user interface 113 contains a screen 209 which displays information from the module 109 and or the storage device 111. The screen 209 can display different information on different regions of the display 209. As shown in FIG. 2 the screen 209 displays the system power factor (98.2%) 211, the system efficiency (95%) 213, the total electrical cost of a weld job ($26.00) 215 and the daily electrical cost of operation ($112.00) 217. The screen 209 can also display a general operational status of the system at 219. This portion of the display screen provides the user with a general operational status of the system 100 based on predetermined operational parameters, and can also display error or warning signs based on various detected operational parameters. Of course, the system 100 can display other information, such as an available power level below a determined demand power level. As described above, the system 100 can be programmed with a demand power level which is not to be exceeded and the system 100 can display a differential between power being consumed and the demand power level to allow a user to determine if a given operation should be performed at that time. Further, the system 100 can display optimal usage schedules based on desired weld schedules and energy costs.

During operation, a user can use the data entry panel 205 to input various information, including operational parameters, energy costs, etc., or can retrieve any information stored in the data storage device 111 regarding a welding or cutting operation. For example, the user interface 113 and data entry panel 205 can be used to define or program operations for the system 100 to be monitored by the system 100. For example, a user can program a first and second welding profile to be performed by the system 100 such that the module 109 monitors each of the different welding profiles when implemented and provides the desired efficiency, power factor and/or cost information to the user at the completion of the welding operations. In this way a user can determine the optimal timing for performing the welding operations to optimize overall energy usage and cost.

Figure 3:
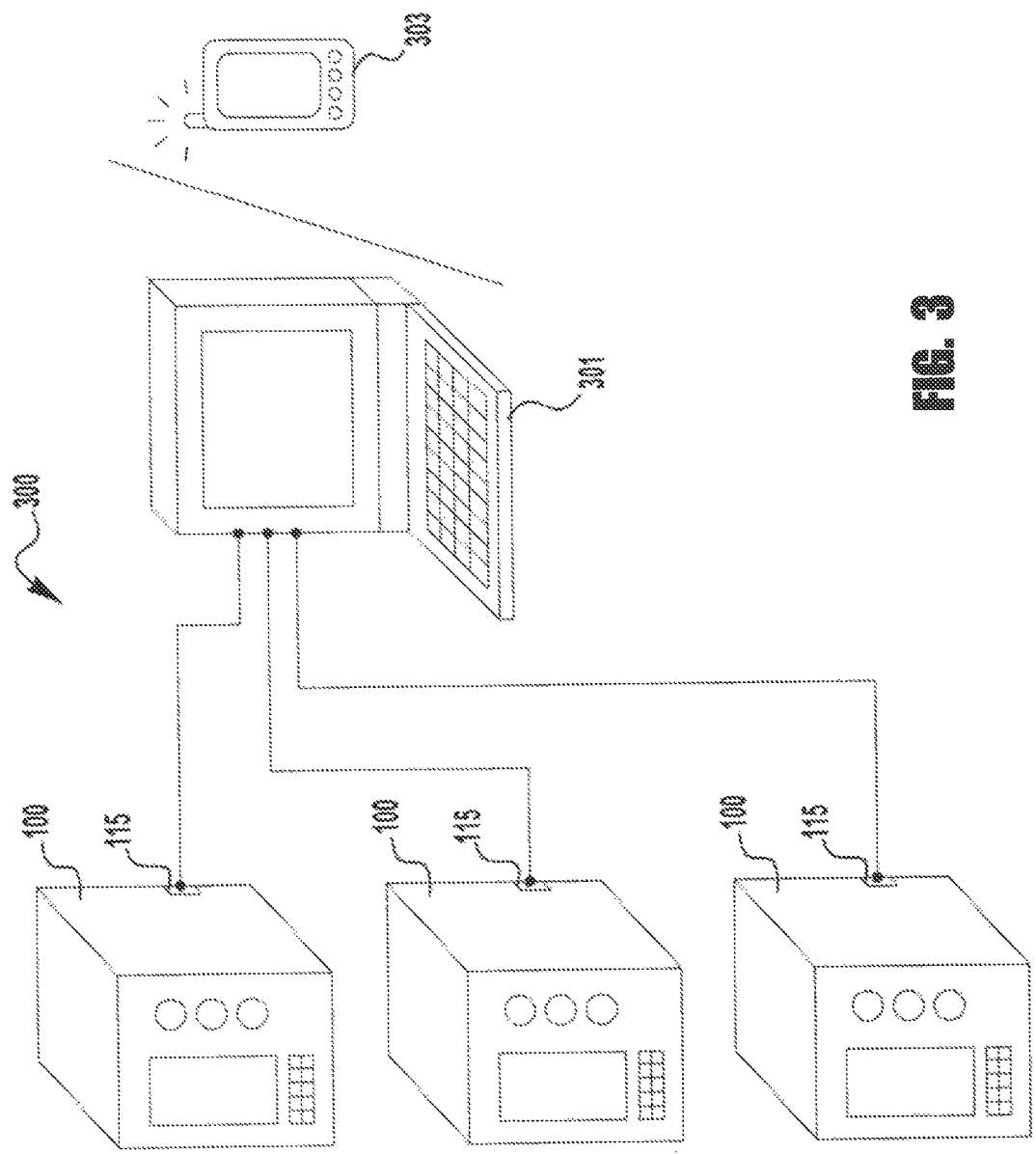
FIG. 3 illustrates a diagrammatical representation of an exemplary welding or cutting system of the present invention.

FIG. 3, depicts a network 300 of exemplary systems 100 which are all coupled to a computer terminal 301 and/or a mobile communication device 303 so that the same information that can be viewed or accessed on the user interface 113 can also be accessed via the terminal 301 and/or mobile communication device 303. Such a system 300 allows a user to monitor the performance and operational cost of multiple systems 100 at a given time such that an overall welding or cutting operation can be monitored or controlled from a single location. Embodiments of the present invention are not limited by methods of communication between the systems 100 and the terminal 301 and or mobile communication device 303. For example, the components of the system 300 can communicate via wired, Ethernet, cellular, public wireless, private wireless communication network. Further, the components of the system can communicate via an internet based communication network. Examples of such communication methods and systems are described in U.S. Pat. No. 7,245,875 entitled "System and Method to Facilitate Wireless Communication in a Welding Environment" and U.S. Pat. No. 7,574,172 entitled "System and Method to Facilitate Wireless Wide Area Communication in a Welding Environment," both of which are incorporated herein by reference, in their entirety. The mobile device 303 can be any one of a pendant control, mobile communication device, smart-phone, tablet, etc.

Thus, the system 300 and computer 301 and/or mobile device 303 can monitor and control the operation of all of the systems 100 as described above such that the same information can be displayed, monitored and programmed at the decives 301/303. For example, the system 300 can be configured such that the device 301 controls the operation of the systems 100 so that power utilization of a facility is optimized based on the relevant demand and cost factors. As an example, the above stated demand charge information can be monitored by the computer 301 such that the computer prevents a programmed demand value from being exceeded. In such an example, a power demand threshold can be programmed into the computer 301 by a user which represents a maximum power usage at any given time and the computer 301 monitors power usage by all of the systems 100 and prevents the operation of any one, or more, of the systems 100 is that usage would cause the demand power threshold to be exceeded. Once power usage drops to a level sufficiently below the threshold level the computer 301 allows a system 100 to be utilized. With such system flexibility, a user of the system 300 can monitor and control power usage at a given facility to determine optimal performance and financial usage of the welding or cutting systems 100. The system 300 can be used to optimize power consumption and cost management for a facility or system 300 taking into account any desired factors.

Figure 4:
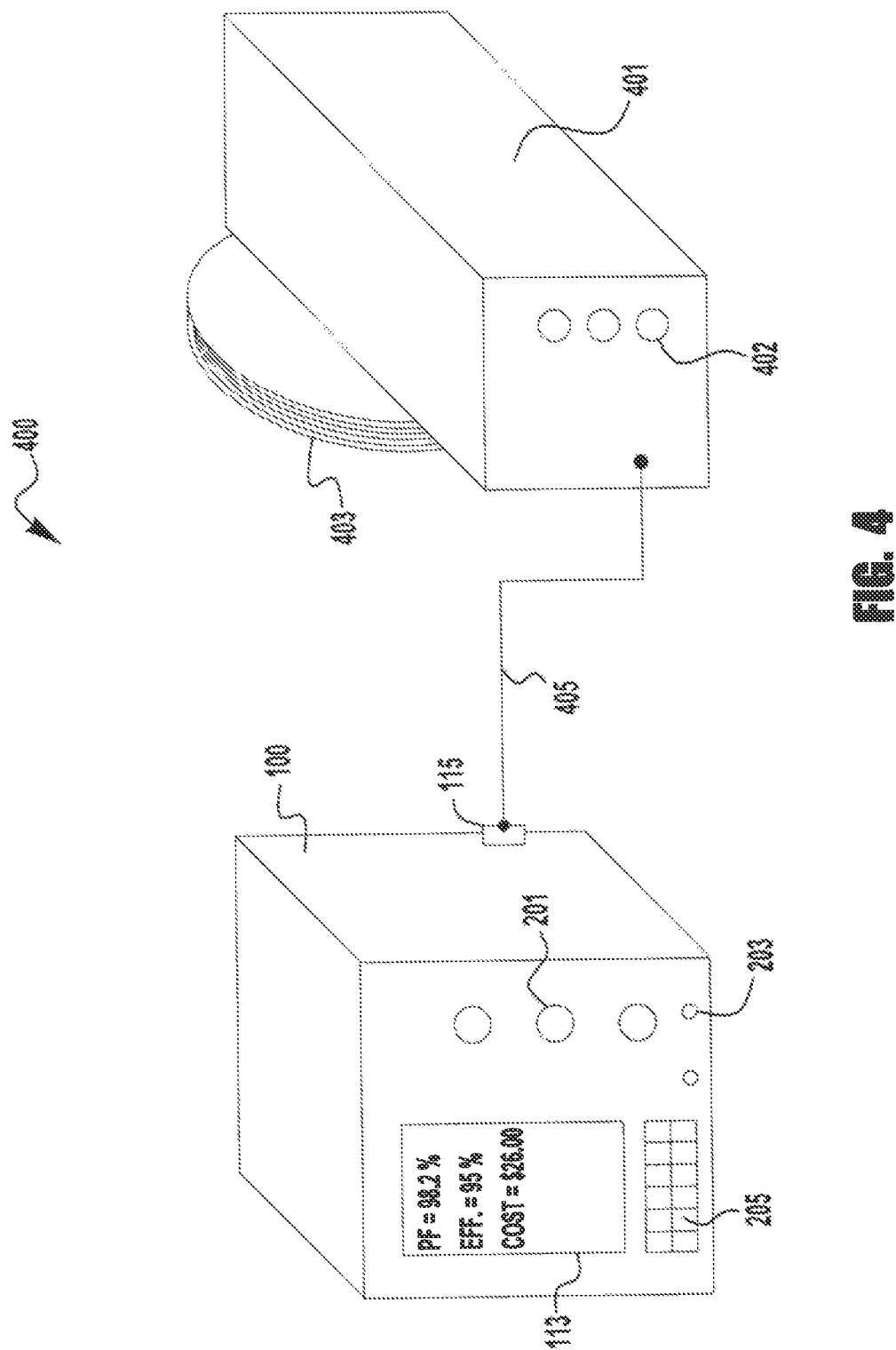
FIG. 4 illustrates a diagrammatical representation of another exemplary system of the present invention.

FIG. 4 depicts another exemplary system 400 of the present invention. The system 400 has a power supply system 100 of the present invention coupled to a wire feeder device 401 which is used to feed a wire electrode 403 to a welding operation (not shown) during welding. The wire feed speed of a welding operation can be set by the controls 402 on the device 401 or the speed can be set by controls 201 on the system 100. In the system shown 400 the amount of wire electrode 403 fed to the welding operation is transmitted to and processed by the module 109 to determine and record an amount of wire fed to a welding operation. Prior to welding, a user can input (e.g., using the data entry device 205) a unit cost for the electrode 403 being consumed such that the module 109 can calculate the cost of wire 403 consumed during a welding operation. For example, a user can input the cost of the wire 403 as $0.02/foot and the module 109 receives information regarding the amount of wire 403 consumed and determines a cost of the welding operation as it is ongoing and/or at its completion. Thus, in some embodiments of the invention, not only can the electrical cost of an operation be calculated but also an electrical+consumable cost can be calculated and displayed for a given welding operation or for a time period of operation. Thus, the user interface can display a total cost of a welding operation (i.e., electrical+consumable), but can display the respective costs separately so that a user can understand, in real time, the electrical and consumable cost of a welding operation. The wire feeder device 401 can be coupled to the system 100 via a wired connection 405 to allow for the transfer of information, but can also be transferred via a wireless connection.

In addition to determining operational energy and wire cost information, other exemplary embodiments can also determine a shielding gas cost. It is known that in some welding operations a shielding gas is employed to shielding the welding operation. Thus, similar to the information regarding the wire 403, a user can input data, via the user interface 113 and/or data entry device 205 regarding the cost of a shielding gas per unit time of welding into the module 109 such that the module can determine a cost of shielding gas during a welding operation. For example, a user can input a cost of shielding gas at $0.05 per minute of welding, at a flow pressure of 14 PSI. Alternatively, a user can input a type of shielding gas and the system 100 contains a look up table with the appropriate cost information. During operation the module 109 will monitor the amount time the welding operation was ongoing (using a timer circuit, or the like) and thus determine a cost of shielding gas. Thus, not only can the module 109 calculate the energy cost, the wire cost, but it can also determine the cost of shielding gas and display each of these costs individually and as a total. In such embodiments, a user can determine an entire cost of a welding operation and use this information to optimize and/or track the use of the systems 100. Such system can also provide a user with a very accurate cost allocation for a specific welding or cutting operation.

Figure 5:
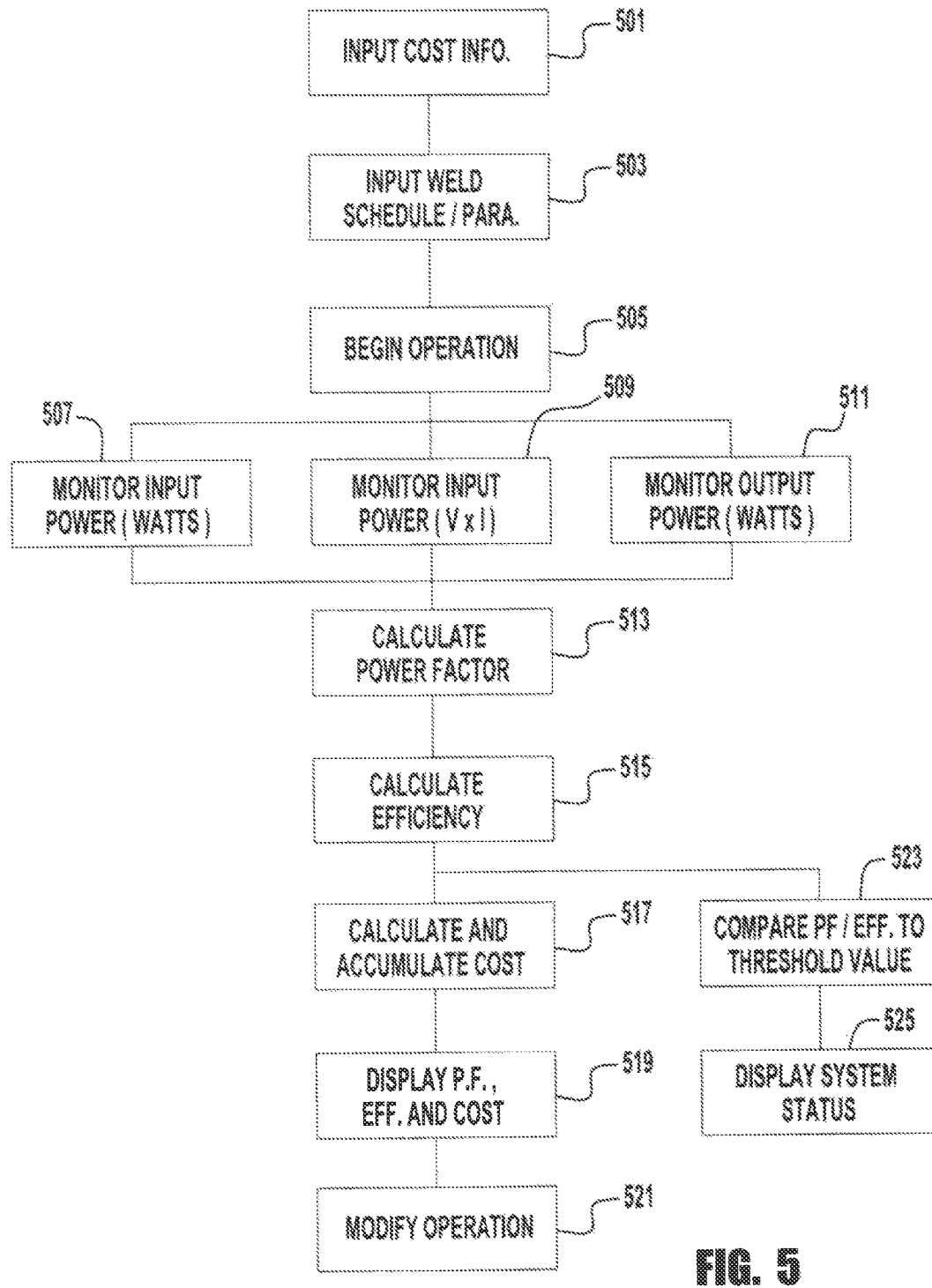
FIG. 5 illustrates a diagrammatical representation of a flow chart to be used with embodiments of the present invention.

FIG. 5 is a representative flow diagram of an operation with an exemplary embodiment of the present invention. In a first step 501, cost information is input into the system 100. This can include energy cost information, consumable cost information and/or shielding gas cost information. This information can be entered into the system via either the data entry device 205 and/or a remote system 301/303 via the data connection 115. In the next step 503 a welding schedule or welding operation can be entered into the system 100. This can be entered via similar methods or via the controls 203. Alternatively, the weld or cutting schedule may have already been installed and stored within the system 100, thus this step can simply be the selection of a preprogrammed weld schedule. Then the welding or cutting process begins at 505. During the operation, the performance module 109 monitors the operation of the system 100, including the input power (watts) 507, the apparent input power (KVA) (V×I) 509 and the output power (watts) 511 of the system 100. At step 513, this information is used to calculate the real-time power factor of the system, and at step 515 this information is used to calculate the efficiency of the system. Also, at step 517 the energy cost is calculated and accumulated such that the total current cost of the operation is displayed as it accumulates. At step 519 each of the determined parameters, i.e., power factor, efficiency and cost, is displayed on the user interface 113 so that the user can monitor the status of the welding or cutting operation. As explained above, the cost of the operation can also include the consumable and shielding gas cost (not specifically shown in FIG. 5), which would require the entry of the appropriate cost information and at least wire feeding information to determine the amount of consumable that has been used. At step 521, the user of the system 100 can evaluate the displayed data, as well as use the user interface 113 to determine a peak and minimum power factor and efficiency achieved. Based on this information the user can modify the welding or cutting operation as desired to improve the operational characteristics of the operation, including changing the time of day at which the operation was performed to improve cost.

In other embodiments, the system can evaluate if whether or not another welding or cutting system 100 can be utilized based on the current detected power usage and associated cost factors.

As also shown in FIG. 5, in some exemplary embodiments of the present invention a performance evaluation step 523 occurs in which at least one of the power factor and efficiency is compared to a threshold performance level and if the performance is below the threshold level a warning indication is provided at the user interface 113 at step 525. The threshold level can be predetermined by the manufacturer of the system 100 and preset into the module 109, or the threshold level or levels can be determined by the user. For example, the user can input, via the user interface 113 and data entry device 205 a threshold efficiency level of 90% such that if the system 100 efficiency drops below 90% during an operation a warning indication is provided.

Furthermore, in other embodiments the system 100/300 can be configured to generate usage recommendations to optimize cost and performance of either a single system 100 or a network of systems 300. For example, the system 100/300 can evaluate the historic power usage for various operations and suggest an operational schedule for a given time period taking into account peak charges, off-peak charges, demand charges, system efficiencies, etc.

It is noted that in FIG. 1, the module 109 is shown as a single module 109 and the data storage device 111 is shown as a separate component. However, embodiments of the present invention are not limited to this configuration as the module 109 can be comprised of a plurality of separate components or modules which perform the same or similar functions. Further, the module 109 and the data storage device 111 can be made integral. It is also noted that the control circuits and control circuitry for the components of the system 100 have not been shown for clarity. However, the control of such circuits is generally known and need not be described herein in detail. Further, it is contemplated that at least some of the functions of the module 109 described herein can be performed by a control circuit used to control at least some of the components of the system.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding or cutting power supply, comprising:
a housing;
a power conversion module located within the housing which receives an input signal having a first voltage, first current and first power and converts said input signal into an output signal having a second voltage, second current and second power which are each different from said respective first voltage, current and powers, and said power conversion module provides said output signal to a load;
a performance monitoring module located within the housing and electrically coupled to said power conversion module which receives a reference signal from said input signal and a reference signal from said output signal during operation of said power conversion module and determines a real-time efficiency of said power conversion module by comparing said first power to said second power during an operation of said power conversion module; and
at least one of a user interface and a data connection device coupled to said housing to provide said determined real-time efficiency to a user.

2. The power supply of claim 1, wherein said power conversion module comprises a DC conversion stage which receives said input signal and modifies said input signal to provide a DC voltage signal before said power conversion module outputs said output signal, and where said DC conversion stage performs power factor correction on said input signal during said operation of said power conversion module, and
wherein said performance monitoring module utilizes at least said input reference signal to determine a real-time power factor ratio of said DC conversion stage and said real-time power factor ratio is provided to at least one of said user interface and said data connection device to provide said real-time power factor ratio to said user.

3. The power supply of claim 2, wherein said performance monitoring module determines at least one of a maximum, minimum and average power factor ratio for said operation.

4. The power supply of claim 2, wherein said determined real-time efficiency, said determined real-time power factor ratio and a cost of said operation is provided to at least one of said user interface and said data connection device to be monitored by said user during said operation.

5. The power supply of claim 1, wherein said performance monitoring module determines at least one of a total, maximum and average amount of said first power utilized during said operation of said power conversion module.

6. The power supply of claim 1, wherein said user interface displays said real-time efficiency for a duration of said operation.

7. The power supply of claim 1, further comprising a data storage device coupled to said performance monitoring module which receives said determined real-time efficiency and records said real-time efficiency for said operation.

8. The power supply of claim 1, wherein said performance monitoring module uses at least one of said input reference signal and said output reference signal to determine a cost of said operation, wherein said cost of said operation includes at least one of a cost of said first power and a cost of a consumable used in said operation.

9. The power supply of claim 8, wherein said cost of said operation is provided to at least one of said user interface and said data connection device.

10. The power supply of claim of claim 8, wherein said cost of said operation is a total cost of operation of said power conversion module over a determined period of time.

11. The power supply of claim 1, wherein said output signal is a signal that is suitable for welding or cutting processes.

12. A welding or cutting power supply, comprising:
a housing;
a DC conversion stage located within the housing which receives an input signal having a first voltage, first current and first power and converts said input signal into a DC output signal having a fixed DC voltage, where said DC conversion stage performs a power factor correction function on said input signal;
an output stage which receives said DC output signal and outputs an output signal having an output voltage, output current and output power which are each different from said respective first voltage, current and powers, and said output signal is provided to a load;
a performance monitoring module located within the housing and electrically coupled to said DC conversion stage which receives a reference signal from said input signal and determines a real-time power factor ratio of said DC conversion stage during an operation of said DC conversion stage; and
at least one of a user interface and a data connection device coupled to said housing to provide said determined real-time power factor ratio to a user.

13. The power supply of claim 12, wherein said performance monitoring module determines a real-time efficiency during said operation by comparing said first power to said output power and said real-time efficiency is provided to at least one of said user interface and said data connection device.

14. The power supply of claim 13, wherein said determined real-time efficiency, said determined real-time power factor ratio and a cost of said operation is provided to at least one of said user interface and said data connection device.

15. The power supply of claim 12, wherein said performance monitoring module determines at least one of a total, maximum and average amount of said first power utilized for said operation.

16. The power supply of claim 12, wherein said user display displays said real-time power factor ratio for a duration of said operation.

17. The power supply of claim 12, wherein said performance monitoring module determines at least one of a maximum, minimum and average power factor ratio for said operation.

18. The power supply of claim 12, further comprising a data storage device coupled to said performance monitoring module which receives said determined real-time power factor ratio and records said real-time power factor ratio for said operation.

19. The power supply of claim 12, wherein said performance monitoring module uses at least one of said input power and said output power to determine a cost of said operation, wherein said cost of said operation includes at least one of a cost of said first power and a cost of a consumable used in said operation.

20. The power supply of claim 19, wherein said cost of said operation is provided to at least one of said user interface and said data connection device.

21. The power supply of claim of claim 19, wherein said cost of said operation is a total cost of operation of said power supply over a determined period of time.

22. The power supply of claim 12, wherein said output signal is a signal that is suitable for welding or cutting processes.

* * * * *